US012759792B2

(12) United States Patent
Wolff

(10) Patent No.: US 12,759,792 B2
(45) Date of Patent: Oct. 13, 2026

(54) METHOD OF ROUTE MANAGEMENT

(71) Applicant: PATOU INVESTMENTS (PTY) LTD, Pretoria (ZA)

(72) Inventor: Tudor Drummond Wolff, Pretoria (ZA)

(73) Assignee: PATOU INVESTMENTS (PTY) LTD, Pretoria (ZA)

( * ) Notice: Subject to any disclaimer, the term of this patent is extended or adjusted under 35 U.S.C. 154(b) by 368 days.

(21) Appl. No.: 18/569,468

(22) PCT Filed: Jun. 22, 2022

(86) PCT No.: PCT/ZA2022/050026
§ 371 (c)(1),
(2) Date: Dec. 12, 2023

(87) PCT Pub. No.: WO2023/279123
PCT Pub. Date: Jan. 5, 2023

(65) Prior Publication Data

US 2024/0270493 A1 Aug. 15, 2024

(30) Foreign Application Priority Data

Jul. 1, 2021 (ZA) ................................ 2021/04582

(51) Int. Cl.
*G06Q 10/047* (2023.01)
*B65G 1/04* (2006.01)
(Continued)

(52) U.S. Cl.
CPC ........... *B65G 1/0492* (2013.01); *B65G 1/065* (2013.01); *B65G 43/00* (2013.01); *B65G 2203/0283* (2013.01)

(58) Field of Classification Search
CPC ...... B65G 1/0492; B65G 1/065; B65G 43/00; B65G 2203/0283; B65G 1/04;
(Continued)

(56) References Cited

U.S. PATENT DOCUMENTS 11,813,751 B2 * 11/2023 Butterfoss .............. B25J 9/1664
11,993,281 B2 * 5/2024 Wray ................ B60W 60/0053

FOREIGN PATENT DOCUMENTS

CN 112183710 A * 1/2021 ............. G06N 3/006
NO 20191379 A1 * 5/2021 ............. G06Q 10/08
(Continued)

OTHER PUBLICATIONS

"International Search Report", issued in International Application No. PCT/ZA2022/050026, Sep. 15, 2022.
(Continued)

*Primary Examiner* — Justin Holmes
(74) *Attorney, Agent, or Firm* — Billion & Armitage

(57) ABSTRACT

A method of route management includes the steps of: (i) providing a plurality of vehicles; (ii) providing pathways along which the vehicles may travel; (iii) determining the current position of each of the vehicles; (iv) associating a destination with each of the vehicles; and (v) determining a first optimal route and speed profile for each vehicle from their current position to the destination, which first optimal route and speed profile for each vehicle is: determined to avoid collision between vehicles; and based on a total efficiency rating for all the vehicles.

8 Claims, 4 Drawing Sheets

(51) Int. Cl.
*B65G 1/06* (2006.01)
*B65G 43/00* (2006.01)

(58) Field of Classification Search
CPC .............. G01C 21/3469; G01C 21/206; G06Q 10/047; G06Q 10/08; G06Q 50/40
See application file for complete search history.

(56) References Cited

FOREIGN PATENT DOCUMENTS

| | | | |
|---|---|---|---|
| WO | 2017186825 | A1 | 11/2017 |
| WO | 2021099474 | A1 | 5/2021 |

OTHER PUBLICATIONS

"Written Opinion of International Searching Authority", issued in International Application No. PCT/ZA2022/050026, Sep. 15, 2022.
Jianming, Cai , et al., "Collaborative Optimization of Storage Location Assignment and Path Planning in Robotic Mobile Fulfillment Systems", Sustainability,vol. 13, No. 10,, May 18, 2021.
Li, Jiaoyang , et al., "Lifelong Multi-Agent Path Finding in Large-Scale Warehouses", arxiv.org, Cornell University Library, 201 Olin Library Cornell University Ithaca, NY 14853,12, Mar. 12, 2021.
Peng, Jufeng , et al., "Coordinating Multiple Robots with Kinodynamic Constraints Along Specified Paths", arxiv.org,vol. 24, No. 4,, Apr. 1, 2005, 295-310.
Wolfgang, Hönig , et al., "Multi-Agent Path Finding with Kinematic Constraints", Jun. 1, 2016.
Wolfgang, Honig , et al., "Persistent and Robust Execution of MAPF Schedules in Warehouses", IEEE Robotics and Automation Letters, IEEE,vol. 4, No. 2,, Apr. 1, 2019.

* cited by examiner

METHOD OF ROUTE MANAGEMENT

BACKGROUND

The present invention relates to a method of route management. More specifically, the present invention relates to a method of managing the routes of a plurality of networked vehicles. Even more specifically, the present invention relates to a method of managing the routes of networked carriages in a railed warehousing system.

Various methods of route management are known. For instance, US2011/0098915 "Device, system and method of dynamic route guidance" describes a method for guiding a vehicle involving the steps of:

- calculating the optimal route from a first location, in which the vehicle is located, to a destination point;
- the vehicle traveling along the optimal route; and
- based on real-time traffic information and real-time road information, determining an updated optimal route to the destination point.

Drawbacks of known methods that use real-time information continuously to update the optimal route to a destination are that:

- they may only influence the path followed by the vehicle that is navigated; and
- they determine the optimal route for the vehicle that is navigated only, and do not determine the overall optimal route for a network of vehicles.

It is an object of the present invention to address these drawbacks.

SUMMARY OF THE INVENTION

According to a preferred embodiment of the invention, there is provided a method of route management including the steps of:

- providing a plurality of vehicles;
- providing pathways along which the vehicles may travel;
- determining the current position of each of the vehicles;
- associating a destination with each of the vehicles; and
- determining a first optimal route and speed profile for each vehicle from their current position to the destination, which first optimal route and speed profile for each vehicle is:
  - determined to avoid collision between vehicles; and
  - based on a total efficiency rating for all the vehicles.

Typically, the total efficiency rating for all the vehicles is one of more of:

- the total distance travelled by all the vehicles to reach their destinations;
- the total time for all the vehicles to reach their destinations;
- the total energy used by all the vehicles to reach their destinations; and
- the total carbon dioxide emitted by all the vehicles to reach their destinations.

Generally, the method of route management further includes the steps of:

- monitoring the position of each of the vehicles on the pathways as they travel along their first optimal routes; and
- determining a second optimal route for each vehicle from their position along the first optimal route to the destination, which second optimal route and speed profile for each vehicle is:
  - determined to avoid collision between vehicles; and
  - based on a total efficiency rating for all the vehicles.

The efficiency rating of a first vehicle may be increased to decrease the total efficiency rating for all the vehicles.

Preferably, the method of route management further includes the step of:

- monitoring the position of objects on the pathways that:
  - the vehicles must avoid or pick up, wherein the steps of determining:

- the first optimal route and speed profile; and
- the second optimal route and speed profile, is also determined:

- to avoid objects; and
- to pick up select objects.

Typically, the pathways comprise railed tracks.

Generally, the railed tracks comprise:

- a first railed track; and
- a second railed track, wherein the first and second railed tracks are vertically spaced from each other and connected to each other via a lift.

Preferably:

- charging stations are disposed along the pathways; and
- the first and second optimal routes for each vehicle is also determined to charge vehicles at charging stations along the first and second optimal routes where the vehicles have insufficient charge to reach their destinations.

BRIEF DESCRIPTION OF THE DRAWINGS

The invention will now be described in more detail, by way of example only, with reference to the accompanying drawings in which.

DESCRIPTION OF THE INVENTION

Figure 1:
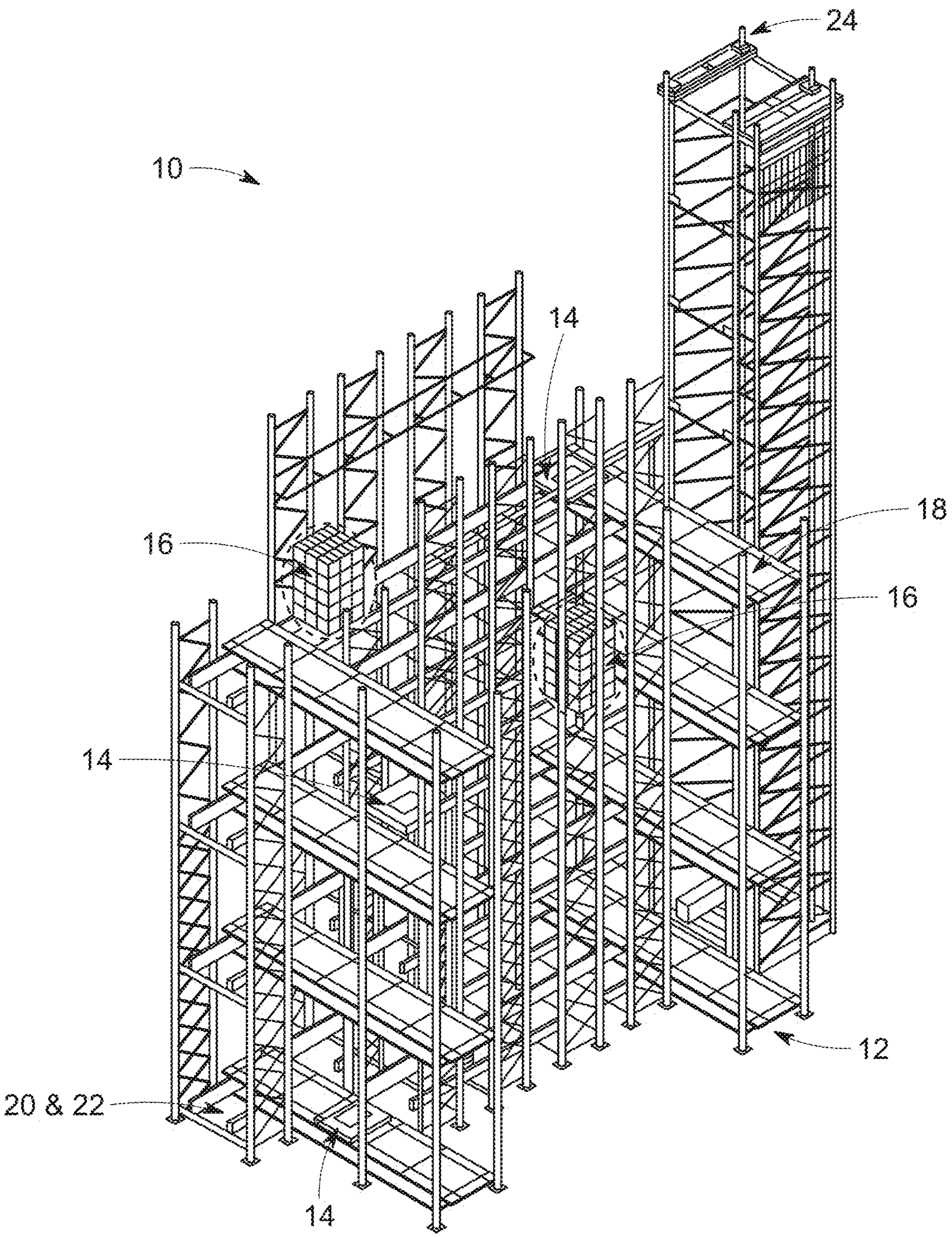
FIG. 1 is a perspective view of a system that operates a method of route management according to a preferred embodiment of the invention at time 1.
Figure 2:
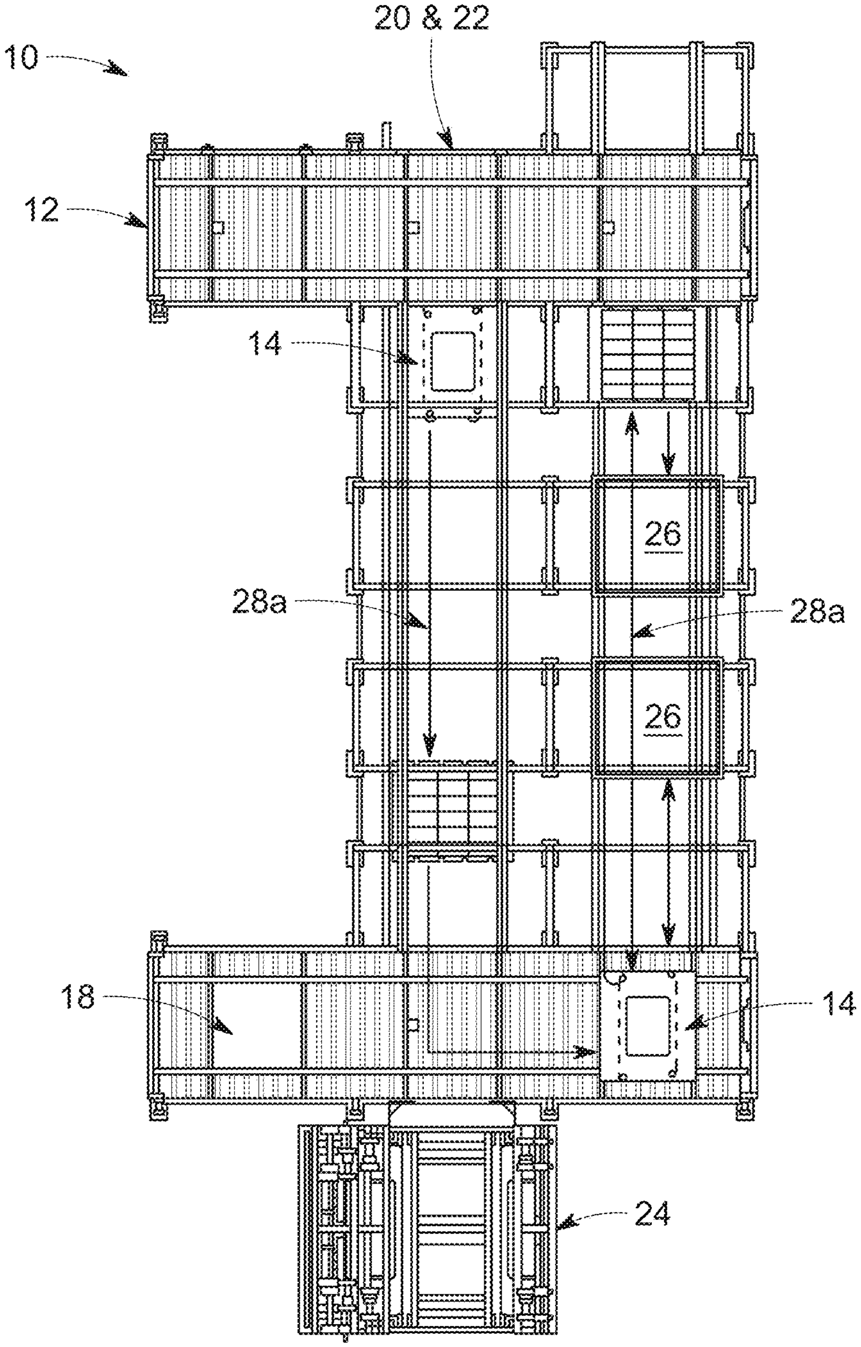
FIG. 2 is a plan view of the system in FIG. 1 at time 1.
Figure 3:
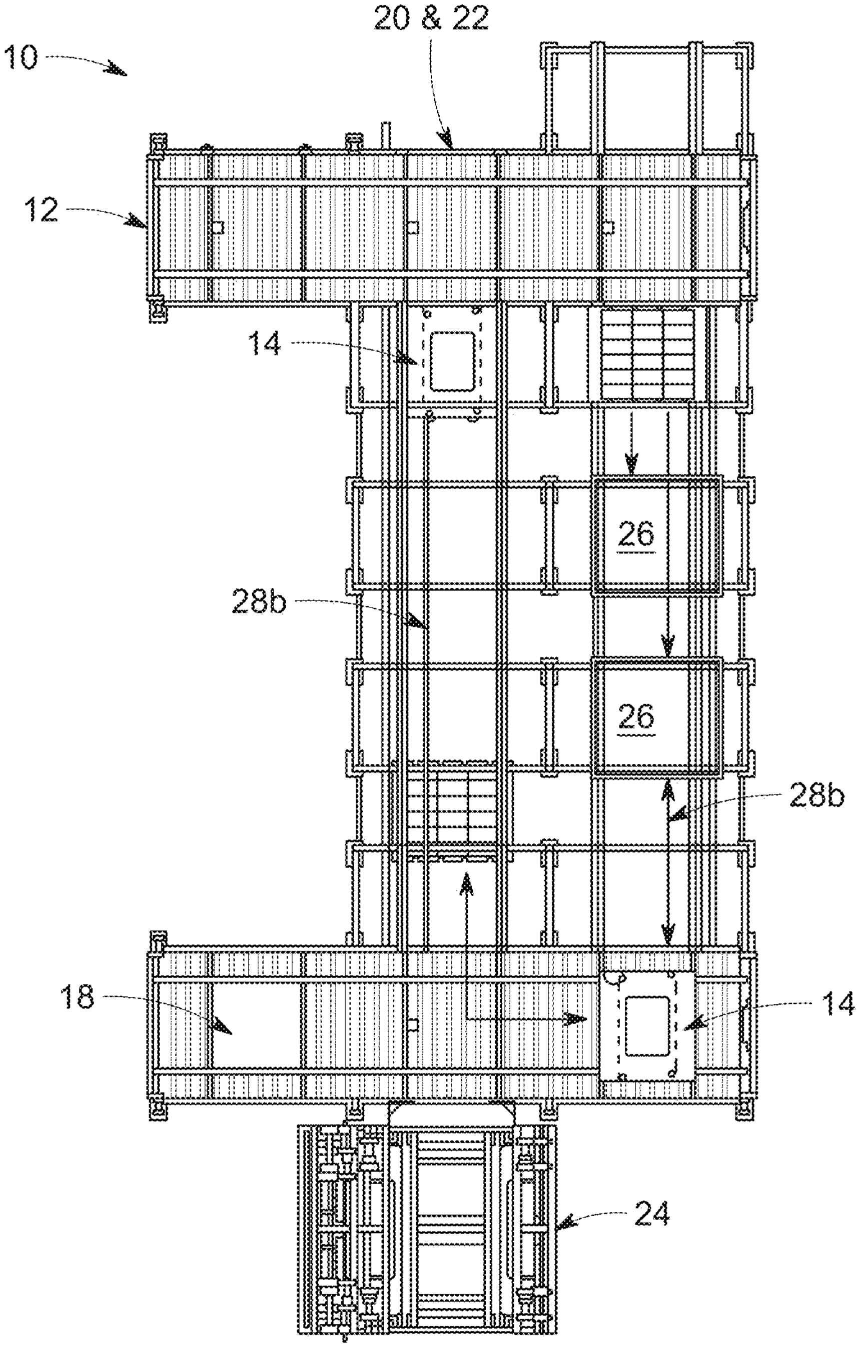
FIG. 3 is a plan view of the system in FIG. 1 at time 2.
Figure 4:
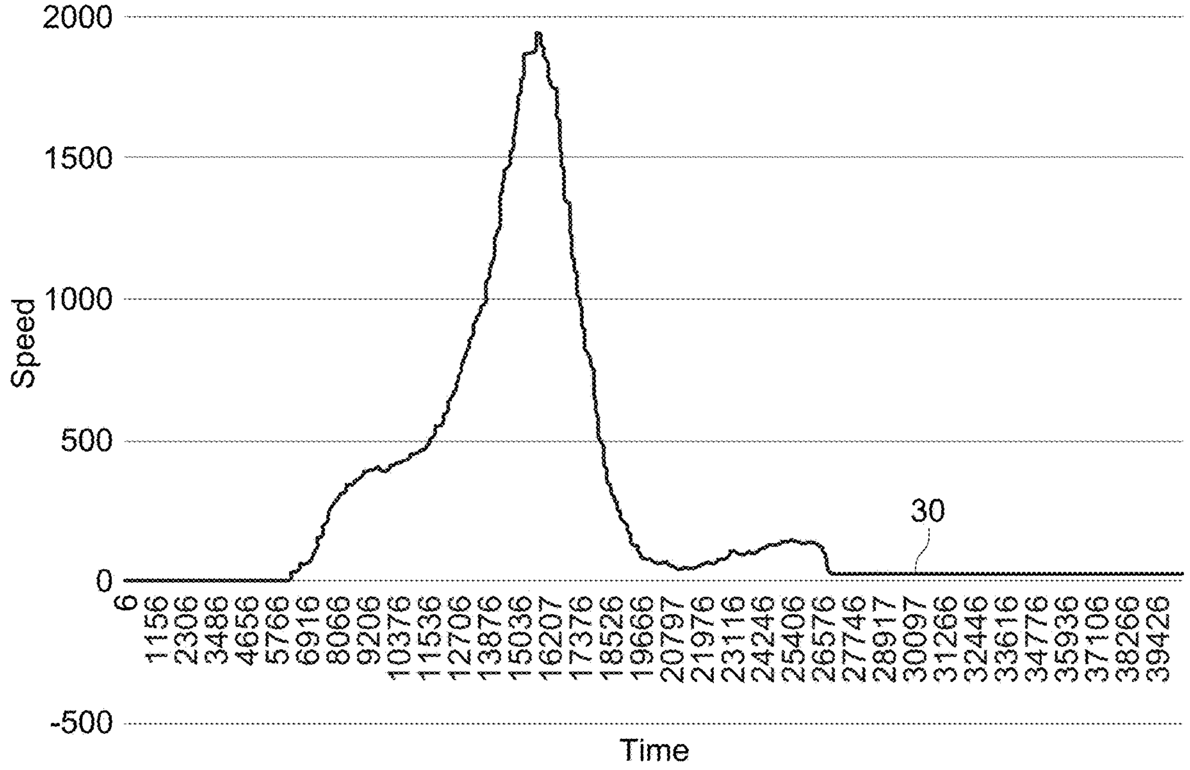
FIG. 4 is a graph showing a speed profile for a vehicle in the system in FIG. 1.

With reference to FIGS. 1 to 4, a system 10 that operates a method of route management includes pathways 12, vehicles 14, objects 16 and charging stations 18.

The pathways 12 comprises a first railed track 20 and a second railed track 22, which first and second railed tracks are vertically spaced from each other, connected to each other via lifts 24. Each of the first and second railed tracks 20 is in the form of a railed orthogonal grid.

The vehicles 14 are electric vehicles (generally referred to as carriages in a warehousing environment) that include wheels that run along the pathways 12. The vehicles 14 are designed to: run beneath pallets; lift pallets and move pallets along the pathways 12.

Objects 16 are disposed on pallets located above the pathways.

Charging stations 18 are disposed along the pathways 12 to provide electrical charge to vehicles 14.

Although the system 10 is shown as a warehousing system for moving objects 16 around a warehouse, it will be appreciated that the system 10 may be any other type of transport system, including a road transport system.

The system 10 operates a method of route management that including the steps of:

1. providing a plurality of vehicles 14;

2. providing pathways 12 along which the vehicles 14 may travel;
3. determining the current position of each of the vehicles 14 at time 1;
4. associating a destination 26 with each of the vehicles 14; and
5. determining a first optimal route **28*a* and speed profile 30 for each vehicle from their current position (at time 1) to the destination, which first optimal route 28*a* and speed profile for each vehicle 14** is:
   - determined to avoid collision between vehicles 14 as they travel along their first optimal routes **28*a***; and
   - based on a total efficiency rating for all the vehicles 14.

The total efficiency rating for all the vehicles 14 is one of more of:

- the total distance travelled by all the vehicles 14 to reach their destinations 26;
- the total time for all the vehicles 14 to reach their destinations 26;
- the total energy used by all the vehicles 14 to reach their destinations 26; and
- the total carbon dioxide emitted by all the vehicles 14 to reach their destinations 26.

As the vehicles 14 travel along their first optimal routes **28*a*:**

- the system 10 monitors the position of each of the vehicles 14 on the pathways 12; and
- determines a second optimal route **28*b* for each vehicle 14 from their position along the first optimal route 28*a* (at time 2) to the destination 26, which second optimal route 28*b* and speed profile for each vehicle 14** is:
  - determined to avoid collision between vehicles 14; and
  - based on a total efficiency rating for all the vehicles 14.

It will be appreciated that the optimal route 28 for the vehicles 14 is continually determined and updated as the vehicles 14 travel towards their destinations 26. Furthermore, as a vehicle 14 travels towards its destination 26, that vehicle's optimal route 28 may vary, adjusting its efficiency rating and/or speed profile upwards or downwards so as to improve the total efficiency rating/achieve an optimal total efficiency rating for all the vehicles 14 in the system 10 (i.e. to achieve the best average efficiency rating for all the vehicles 14 in the system 10). In essence, the system 10 focusses on improving the efficiency of all the vehicles 14 in the system 10 instead of focussing exclusively on improving the efficiency rating of only one vehicle 14 in the system 10.

The method also includes the step of monitoring the position of objects 16 on the pathways 12 that the vehicles 14 must avoid or pick up for delivery to the destinations 26. Consequently, the steps of determining:

- the first optimal route **28*a*** and speed profile; and
- the second optimal route **28*b*** and speed profile, is also determined:

- to avoid objects 26; and
- to pick up select objects 26.

The first and second optimal routes **28*a* and 28*b* for each vehicle 14 may also be determined to charge the vehicles 14 at charging stations 18 along the first and second optimal routes 28*a* and 28*b* when the vehicles 14 have insufficient charge to reach their destinations 26**.

It will be appreciated that the system 10 uses real-time information regarding the position of vehicles 14 and objects 16 continuously to update the optimal route 28 to vehicle destinations 26 in such a way that guided travel of one vehicle 14 along its optimal route 28 influences guided travel of another vehicle 14 along its optimal route 28 to determine the overall optimal routes for all vehicles 14 in the network of vehicles and thereby optimise the efficiency rating of all networked vehicles 14.

The invention claimed is:

1. A method of route management including the steps of:
- providing a plurality of vehicles;
- providing pathways along which the vehicles may travel;
- providing a control system for guiding the plurality of vehicles along the pathways;
- determining the current position of each of the vehicles;
- associating a destination with each of the vehicles;
- determining a first optimal route and speed profile for each vehicle from their current position to the destination, which first optimal route and speed profile for each vehicle is:
  - determined to avoid collision between vehicles; and
  - based on a total efficiency rating for all the vehicles; and
- operating the control system to guide each of the vehicles along its respective first optimal route.

2. The method of route management according to claim 1, wherein the total efficiency rating for all the vehicles is one of more of:
- the total distance travelled by all the vehicles to reach their destinations;
- the total time for all the vehicles to reach their destinations;
- the total energy used by all the vehicles to reach their destinations; and
- the total carbon dioxide emitted by all the vehicles to reach their destinations.

3. The method of route management according to claim 2, further including the steps of:
- monitoring the position of each of the vehicles on the pathways as they travel along their first optimal routes; and
- determining a second optimal route for each vehicle from their position along the first optimal route to the destination, which second optimal route and speed profile for each vehicle is:
  - determined to avoid collision between vehicles; and
  - based on a total efficiency rating for all the vehicles.

4. The method of route management according to claim 3, wherein the efficiency rating of a first vehicle may be increased to decrease the total efficiency rating for all the vehicles.

5. The method of route management according to claim 4, further including the step of:
- monitoring the position of objects on the pathways that: the vehicles must avoid or pick up, wherein the steps of determining:
- the first optimal route and speed profile; and
- the second optimal route and speed profile, is also determined:
- to avoid objects; and
- to pick up select objects.

6. The method of route management according to claim 5, wherein the pathways comprise railed tracks.

7. The method of route management according to claim 6, wherein the railed tracks comprise:
- a first railed track; and
- a second railed track, wherein the first and second railed tracks are vertically spaced from each other and connected to each other via a lift.

8. The method of route management according to claim 7, wherein:
- charging stations are disposed along the pathways; and the first and second optimal routes for each vehicle is also determined to charge vehicles at charging stations along the first and second optimal routes where the vehicles have insufficient charge to reach their destinations.

* * * * *